Patented Feb. 22, 1949

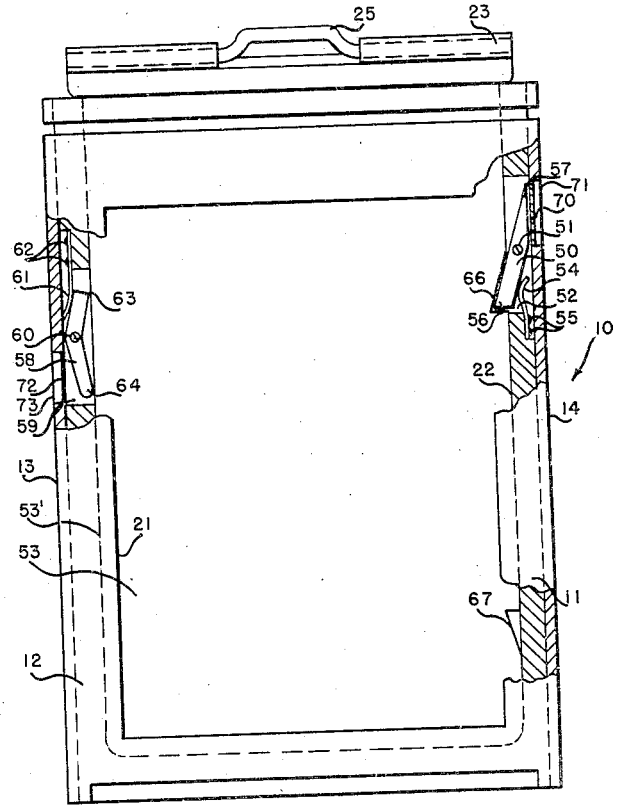
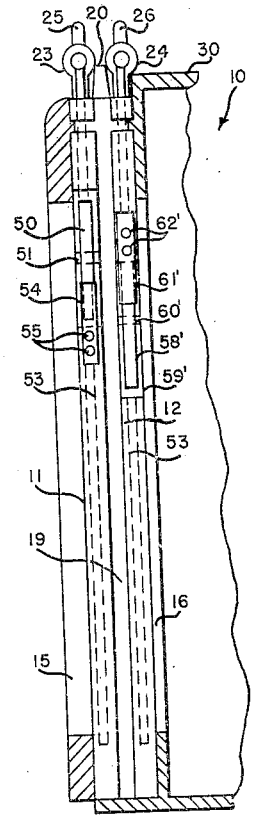
FIG. 1    FIG. 2
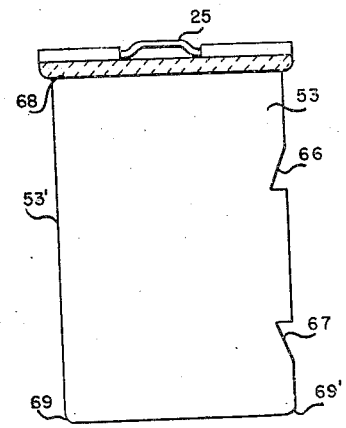
FIG. 3

2,462,683

UNITED STATES PATENT OFFICE 2,462,683

PLATE HOLDER WITH SAFETY LOCK

Morris Schwartz and William Castedello, Stamford, Conn., assignors to The Kalart Company, Inc., Stamford, Conn.

Original application April 28, 1945, Serial No. 590,932. Divided and this application January 22, 1947, Serial No. 723,522

7 Claims. (Cl. 95—71)

This invention relates to plate holders for photographic apparatus such as cameras of any description, particularly to plate holders of a type in which the sensitized plate placed in the plate holder is normally covered by a dark slide which is removed for exposure and replaced after completed exposure.

Plate holders of this type are usually provided with a marking such as a contrasting strip at one side while the other side of the slide is left unmarked. The purpose of such contrasting marking is to indicate to the photographer whether a plate covered by the slide has been exposed. The photographer may then turn the unmarked face of the slide to the outside when the plate holder is loaded with an unexposed plate and reverse the slide when replaced after exposure so that the marked face of the slide is now at the outside. Practical experience shows that in a certain number of cases the photographer will forget to reverse the slide after exposure or disregard the fact that the marked side is at the outer side.

Several locking devices are known in the art for locking a slide covering an exposed plate. However, most devices hitherto known require manual operation by the photographer, thereby causing a certain number of errors and oversights on the part of the photographer.

One object of the invention is to provide a novel and improved locking device which does not require manual operation by the photographer but will lock the slide after a reversal following exposure automatically in a fully inserted position thereby avoiding accidental double exposure of a plate.

Another object of the invention is to provide a novel and improved locking device which prevents a replacement of the slide after exposure without reversal of the slide position thereby forcing the photographer to place the slide in a position in which the marked face of the slide is at the outside, thus indicating that the plate covered by the slide has already been exposed.

Another object of the invention is to provide means permitting an intentional removal of a reversed slide after exposure by additional manipulation, for instance in the dark room or when the photographer desires to make a double exposure, for example for purposes of trick photography.

Another object of the invention is to provide a novel and improved locking device which is not dependent on diligence and attention of the photographer and hence is foolproof for all practical purposes.

Other and further objects and advantages of the invention will be described hereinafter and set forth in the appended claims, forming part of the application.

According to a now preferred embodiment of the invention the previously enumerated objects of the invention and other objects hereinafter described are accomplished by providing one or more spring loaded pawls which coact with corresponding notches or recesses in the slide and are arranged so that the slide can be inserted with the unmarked side at the outside when the plate holder is loaded in the dark room and can be removed for exposure of the plate. After the slide has been once removed, the pawls and notches will engage each other when an attempt is made to replace the slide without reversal after exposure, but they will pass each other when the plate is inserted with the marking at the outside, thereby forcing the photographer to reinsert the slide in a correct position after reversal. When the slide with the marking at the outside is completely pushed home, the pawls and recesses will engage each other, thus effectively preventing a renewed removal of a slide covering the exposed plate without additional manipulation. The arrangement of the coacting pawls and notches will be more fully explained in the subsequent description.

The present application is a divisional application based on our co-pending parent application Ser. No. 590,932 filed April 28, 1945, now Patent No. 2,455,814, issued December 7, 1948.

In the accompanying drawing a now preferred embodiment of the invention is shown by way of illustration and not by way of limitation.

Fig. 1 is a plan view of a plate holder according to the invention, part of the plate holder frame being broken away in order to show the locking device.

Fig. 2 is a sectional side view of the plate holder, and

Fig. 3 is a plan view of a slide for a plate holder according to the invention on a reduced scale.

The plate holder which has been illustrated in the drawing and is described hereinafter is a conventional plate holder of the duplex type. In this connection it should be noted that the term "plate holder," as herein used, shall also include holders for films. In the event that a film or film pack is employed, a sheath is provided to receive the film, the sheath with the film being placed in the holder in the usual manner. It is only essential for the application of the invention that the plate or film holder has one or more slides which are removed for the exposure of the plate or film and replaced after exposure.

Referring now to Figs. 1, 2 and 3 in detail the plate holder, as shown in these figures, comprises a substantially rectangular container made of any suitable material impervious to light such as wood, plastic, metal, etc. The plate holder container, generally designated by 10, is formed by two plates 11 and 12 joined by means of walls 13 and 14. Each of the side plates has the usual windows or openings 15 and 16. The plate holder container is subdivided by a partition wall 19 to provide for the reception of two plates in the holder. The partition wall has an extension 20 which, as best seen in Fig. 2, is extended beyond the upper edges of side walls 13 and 14. In each of walls 13, 14 or in the material of plates 11, 12 grooves 21, 22 are provided, as can be best seen in Fig. 1. These grooves serve to guide dark slides 53 and to hold them in their positions in the plate holder.

The upper end of each slide is extended over the upper edge of the container itself and provided with a substantially U-shaped member 23, 24 respectively secured to the extended portion of the respective slide. These U-shaped members may be fastened to the slides by any suitable means and support handles 25, 26 respectively to facilitate removal of the slides from the holder and replacement thereof. One side of the U-shaped members or of the dark slide itself is preferably marked differently from the other slide in order to enable the photographer to see whether the plate covered by the slide has been exposed. In practice, the photographer will insert a slide into the plate holder in such a manner that the unmarked side of the slide faces outwardly when the plate is unexposed and reverse the slide after the plate is exposed. The contrasting mark for instance a white or silvered strip 68 on the slide holder will then indicate that the slide covers an exposed plate.

The plate holder, as hereinbefore described, is conventional and it should of course be understood that the plate holder may be provided with the usual lining for protecting the sensitized plate against the intrusion of unwanted light and with means to facilitate the insertion and removal of the plate in the dark room such as a hinged bottom section of the plate holder container. Since the structural details of the plate holder as such are not essential for the understanding of the invention, they need not to be described here in detail.

The plate holder after being loaded is inserted in the casing 30 of the camera, part of which is diagrammatically shown in Fig. 2 and is held in this position by the usual guiding and locking means provided at the camera casing.

According to the invention which will now be described a locking means is provided which automatically, that is, without requiring manual operation by the photographer, prevents an accidental removal of the slide after an exposure has been made and the slide has been replaced after a reversal of the slide position as previously explained. In addition, the locking means forces the photographer to reverse the slide before replacement since the slide can be pushed home only in a reversed position after once having been removed. In other words, the plate holder according to the invention effectively eliminates any possibility of a double exposure due to oversight or carelessness of the photographer.

The locking means comprise two spring loaded pawls or arms coacting with corresponding notches or recesses in the slides. One locking device is provided for each slide.

Each locking device comprises a two-arm pawl 50 pivotal about a pivot point 51. Each pawl is disposed in a recess 52 provided in the walls of the container 10 of the plate holder, for instance in the wall 14 joining plates 11 and 12. Fig. 1 shows a plan view of the plate holder in which part of the side plate 11 is broken away to illustrate the location of recess 52. Each pivot 51 is fastened to the bottom of the recess so that pawl 50 can pivot within the recess. The pawls are approximately flush with a slide 53 inserted in the plate holder. A spring 54 is fastened by rivets 55 or other suitable means within the recess for instance in an extension thereof, and urges one arm of pawl 50 to turn in clockwise direction so that a nose 56 of the pawl will be moved into the path of slide 53. The other arm 57 of pawl 50 is extended and shaped to abut against a light-tight cover 70 covering an opening 71 provided in the side wall of the recess. This cover which may be made of treated textile or leather permits to pivot pawl 50 against the action of spring 54 by exerting a pressure against the outside of the cover and also limits the pivotal movement of pawl 50 as caused by the pressure of spring 54. A second and similar pawl 58 is supported in a second recess 59 located in the opposite side wall 13 of the container. Pawl 58 is pivotal about a pivot 60 supported on the bottom of recess 59. A spring 61 fastened by rivets 62 in the recess for instance in an extension thereof urges nose 63 of the pawl 58 to move into the path of slide 53 when the same is inserted in the plate holder. The end 64 of pawl 58 is shaped and arranged to abut against a light-tight cover 72 covering an opening 73. This cover, preferably made of treated textile or leather, permits to pivot pawl 58 against the action of spring 61 by exerting a pressure against the outside of the cover and also limits a pivotal movement of the pawl by the action of spring 61. As can best be seen from Fig. 1, spring 61 urges pawl 58 to turn in clockwise direction.

Springs 54 and 61 are shown as springs supported by the plate holder walls but it should of course be understood that the springs may also be supported by the pawls themselves and abut directly against a suitable wall of the recess. Slide 53 which is shown in Fig. 3 on a reduced scale has two notches or recesses 66 and 67 respectively at one of its longitudinal sides. Each notch has an edge parallel to the bottom edge of the slide and a slanted edge, the two parallel edges of the notches facing each other. The notches are placed so that they are in the right hand side of the slide for an observer looking at the marked side of the slide. As will be remembered the marking 68 is at the outside when the slide is in its "exposed position."

The bottom edges of slide 53 are preferably rounded at 69 and 69' respectively; the purpose of these rounded edges will be subsequently explained.

The operation of the locking device, as hereinbefore described, is as follows:

Let it be assumed that an operator has placed an unexposed plate or film into the plate holder and inserts the respective slide 53 in a position in which marking 68 is turned toward the inside of the plate holder. In this position of the slide face, nose 63 of pawl 58 will engage notch 67 when the slide is inserted to a certain extent. By pressure against the outside of cover 72, the operator can lift pawl 58 out of notch 67 and push the slide home. Pawl 50 opposite to pawl 58 will not interfere with the insertion of the slide as this pawl engages the smooth edge 53' of the slide. The second notch 66 will not be engaged by pawl 58 since the pawl will simply slide over the notch when it passes this notch, as will be apparent from an examination of the drawings. The rounded edges 69, 69' serve to press the pawls aside when the slide is pushed home. The plate holder is now ready for insertion into the camera.

When the operator intends to take a picture, he simply withdraws the slide as nose 63 of pawl 58 will slide over and out of both notches 66 and 67. Having made the exposure the photographer has to reinsert the slide. Assuming first that he forgets to reverse the slide and attempts to reinsert he slide wih the unmarked side at the outside, then he will find that pawl 58 will re-engage notch or recess 67 as soon as a certain part of the slide has been inserted. Hence, the photographer cannot push home the slide without additional manipulation (lifting of pawl 58 out of notch 67) and is thus reminded that he has forgotten to reverse the plate. Assuming now that he has reversed the slide and tries to insert it into the plate holder, then pawl 58 faces the smooth edge 53' of the slide (position of the slide as shown in Fig. 1). The edge of the slide having notches 66 and 67 will face pawl 50. Due to the configuration of pawl 50 and notch 67 pawl 50 will slide over notch 67, thus permitting a continued insertion of the slide. Finally, when the slide has been completely pushed home, pawl 50 will engage notch 66.

It should of course be understood that pawl 50 and notch 66 are so positioned that they can engage each other only when a slide is fully pushed home in the plate holder.

As a result of the engagement of the slide notch 66 by pawl 50, the operator cannot withdraw the slide without additional manipulation.

If he wants to remove the slide, for instance in the dark room, pawl 50 is released by pressing against the outside of cover 70 with a finger whereby the pawl nose 56 will be lifted out of notch 66.

It will of course be understood that the notches 66 and 67 should be relatively small and covered by the plate holder sides so that no light can reach the plate or film inserted in the plate holder through the notches.

As previously mentioned, each slide is provided with a locking device according to the invention. As can best be seen in Fig. 2, the pawls for the second slide 53 are similarly located as the pawls for the first slide 53 previously described. Corresponding parts of the locking device for the second slide 53 are indicated by primed reference characters; it is therefore believed that no detailed description of the locking device of the second slide is necessary.

As will appear from the previous description, the locking device according to Figs. 1, 2 and 3 accomplishes, among others, the following objects:

1. It permits a convenient insertion of the slide in the dark room.

2. It permits a withdrawal of the slide for exposure of an unexposed plate or film.

3. It forces the photographer to reinsert the slide in a reversed position after exposure.

4. It prevents a second removal of a slide covering an exposed plate or film without manipulation of the locking device.

While the invention has been described in detail with respect to a certain now preferred example and embodiment it will be understood by those skilled in the art after understanding our invention that various changes and modifications may be made without departing from the spirit and scope of our invention, and it is intended therefore, in the appended claims, to cover all such changes and modifications.

What is claimed as new and desired to be secured by Letters Patent is:

1. Plate holder of the type described for photographic apparatus comprising two pivotal pawls mounted at opposite sides of the plate container of the holder, and a slide having two spaced notches at one of its sides, one of said pawls being constructed and positioned to coact with one of the notches for blocking slide movements in one direction, the other pawl being constructed and positioned to coact with the other notch for blocking slide movements in opposite direction, said pawls and notches being arranged to remain inoperative in response to a removal of a slide inserted in a predetermined slide face position and upon reinsertion of the slide in the reversed slide face position, and to engage each other in response to an attempted reinsertion of the slide in the said predetermined slide face position for blocking such reinsertion, and also for locking a slide completely inserted in reversed slide face position, thereby preventing a removal of a reversed inserted slide without manipulation of the locking device.

2. Plate holder as described in claim 1, wherein one of the pawls and the slide notch coacting therewith are positioned and arranged to engage each other when the slide is completely inserted in a predetermined slide face position, thereby locking the slide in such position, and wherein the other of the pawls and the notch coacting therewith are positioned and arranged to engage each other when the slide is partly inserted in reversed slide face position, thereby preventing a complete insertion of a slide in such reversed position.

3. Plate holder as described in claim 1, wherein each pawl comprises a lever pivotally mounted in a recess of the plate holder, and spring means urging the lever toward the adjacent edge of a slide inserted in the plate holder.

4. Plate holder as described in claim 1, wherein each of said notches provided in the slide is shaped to permit a passage of the respective coacting pawl in one direction of slide movement and to cause a locking engagement between slide and the respective coacting pawl in response to a slide movement in the opposite direction.

5. Plate holder as described in claim 1, wherein a yieldable portion is provided in the side walls of the plate container opposite to each pawl for disengaging a pawl from an engaged notch by exerting a pressure against the respective yieldable portion causing the adjacent pawl to pivot out of engagement with the respective notch.

6. Plate holder of the type described for photographic apparatus comprising pawls mounted at opposite sides of the plate container of the holder, and a slide having spaced notches at one of its sides, one of said pawls being constructed and positioned to coact with one of the notches for blocking slide movements in one direction, another pawl being constructed and positioned to coact with another notch for blocking slide movements in opposite direction, said pawls and notches being arranged to remain inoperative in response to a removal of a slide inserted in a predetermined slide face position and upon reinsertion of the slide in the reversed slide face position, and to engage each other in response to an attempted reinsertion of the slide in the said predetermined slide face position for blocking such reinsertion, and also for locking a slide completely inserted in reversed slide face position, thereby preventing a removal of a reversed slide without manipulation of said locking means.

7. Plate holder of the type described for photographic apparatus comprising pawls mounted at opposite sides of the plate container of the holder, and a slide having a notch and a pointed edge at one of its sides, said pointed edge being positioned prior to said notch in the direction of insertion of the slide, one of said pawls being constructed and positioned to coact with said pointed edge for blocking slide movements in one direction, another pawl being constructed and positioned to coact with said notch for blocking slide movements in the opposite direction, said pawls being arranged to remain inoperative in response to a removal of a slide inserted in a predetermined slide face position and upon reinsertion of the slide in the reversed slide face position, one of said pawls engaging the pointed edge in response to an attempted reinsertion of the slide in the said predetermined slide face position for blocking such reinsertion, said other pawl engaging the notch upon complete reinsertion of the slide in reversed slide face position, thereby locking the slide in the said reversed position for preventing a removal of a reversed slide without manipulation of said locking means.

MORRIS SCHWARTZ.
WILLIAM CASTEDELLO.

REFERENCES CITED

The following references are of record in the file of this patent:

UNITED STATES PATENTS

| Number | Name | Date |
|---|---|---|
| 484,569 | Pierce | Oct. 18, 1892 |